(12) United States Patent
Tu et al.

(10) Patent No.: US 7,110,214 B1
(45) Date of Patent: Sep. 19, 2006

(54) DISK DRIVE TO IMPLEMENT A SEEK OPERATION UTILIZING A DECELERATION VELOCITY PROFILE THAT MATHEMATICALLY MODELS BEMFS

(75) Inventors: Kuang-Yang Tu, Irvine, CA (US); David Dung Tien Nguyen, Fountain Valley, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 11/039,401

(22) Filed: Jan. 18, 2005

(51) Int. Cl.
*G11B 5/596* (2006.01)

(52) U.S. Cl. .................................. 360/78.06
(58) Field of Classification Search ............. 360/78.06, 360/75, 78.07, 78.08, 78.09, 77.02, 78.01
See application file for complete search history.

(56) References Cited

U.S. PATENT DOCUMENTS

| | | | |
|---|---|---|---|
| 5,889,629 A * | 3/1999 | Patton, III | 360/75 |
| 6,038,096 A | 3/2000 | Zhang et al. | |
| 6,178,060 B1 * | 1/2001 | Liu | 360/78.07 |
| 6,850,386 B1 * | 2/2005 | Kovinskaya et al. | 360/78.06 |
| 6,937,431 B1 * | 8/2005 | Galloway | 360/78.06 |
| 2004/0264036 A1 * | 12/2004 | Ding et al. | 360/78.08 |

OTHER PUBLICATIONS

Yi, Li, et al., "Two-Degree-of-Freedom Control with Robust Feedback Control for Hard Disk Servo Systems", IEEE/ASME Transactions on Mechatronics, vol. 4, No. 1, pp. 17-24, Mar. 1999.

\* cited by examiner

*Primary Examiner*—Fred F. Tzeng
(74) *Attorney, Agent, or Firm*—Blakely Sokoloff Taylor & Zafman; Jonathan E. Prejean, Esq.

(57) ABSTRACT

Disclosed is a disk drive including an actuator having a coil, a head attached to the actuator, and a disk including at least a first track and a second track, and a processor for controlling operations in the disk drive including a seek operation from the first track to the second track in which the head is moved between the first track and the second track by the movement of the actuator. The processor under the control of a program generates a deceleration velocity profile for the seek operation that is determined based upon a deceleration velocity profile function that includes a back electromagnetic force (BEMF) model to take into account back electromagnetic forces (BEMFs) associated with the coil of the actuator such that the BEMFs are mathematically modeled. The head is commanded to seek to the second track utilizing the deceleration velocity profile function that includes the BEMF model.

12 Claims, 6 Drawing Sheets

DISK DRIVE TO IMPLEMENT A SEEK OPERATION UTILIZING A DECELERATION VELOCITY PROFILE THAT MATHEMATICALLY MODELS BEMFS

BACKGROUND OF THE INVENTION

1. Field of the Invention

The present invention relates to disk drives. More particularly, the present invention relates to a disk drive that implements a seek operation that utilizes a deceleration velocity profile which mathematically models back electromagnetic forces (BEMFs) associated with an actuator.

2. Description of the Prior Art and Related Information

Today, computers are routinely used both at work and in the home. Computers advantageously enable file sharing, the creation of electronic documents, the use of application specific software, and electronic commerce through Internet and other computer networks. Typically, each computer has a storage peripheral such as a disk drive (e.g. a hard disk drive).

A huge market exists for hard disk drives for mass-market computer systems such as servers, desktop computers, and laptop computers. To be competitive in this market, a hard disk drive should embody a design that is adapted for providing rapid access to data and providing high data storage capacity, while at the same time being energy efficient.

Satisfying these competing constraints of rapid access to data, high data storage capacity, and energy efficiency requires innovation in many of the numerous components of the disk drive.

Further, many newer smaller hard disk drives require reduced power consumption, as well as reduced memory usage, in the processing circuitry of the disk drive itself.

Typically, the main assemblies of a hard disk drive are a head disk assembly (HDA) and a printed circuit board assembly (PCBA). The head disk assembly includes an enclosure including a base and a cover, at least one disk having at least one recording surface, a spindle motor for causing each disk to rotate, and an actuator arrangement. The PCBA generally includes circuitry for processing signals and controlling operations in the disk drive.

An actuator arrangement that is commonly used in hard disk drives is a rotary actuator arrangement included as part of a head stack assembly (HSA) that includes a collection of elements of the head disk assembly. The collection typically includes certain prefabricated subassemblies and certain components that are incorporated into the head disk assembly. For example, a prefabricated head stack assembly (HSA) may include a pivot bearing cartridge, a rotary actuator arrangement, and permanent magnets and an arrangement for supporting the magnets to produce a magnetic field for a voice coil motor.

The rotary actuator arrangement of the HSA may also include a coil forming another part of the voice coil motor, an actuator body having a bore through it, and a plurality of arms projecting parallel to each other and perpendicular to the access of the bore. The rotary actuator arrangement of the HSA may also include head gimbal assemblies (HGAs) that are supported by the arms. Each HGA includes a load beam and a head supported by the load beam. The head is positioned over a track on a recording surface of the disk to write or read data to or from the track, respectively.

Because of the competitive pressure to continually develop hard disk drives that provide faster and more robust access to data, techniques are continuously being developed to decrease the access time to data. One technique to accomplish this is by increasing the speed at which the HSA is pivoted to position the head over a track of the disk in order to access data as part of a seek operation. Particularly, in order to provide faster access to data, techniques are continually being developed to decrease seek time to data.

The seek time generally refers to the time required to move the head of the actuator from a current position or current track to a target position or target track. The seek time is determined by the mechanical characteristics of the HSA and by a seek profile. The seek profile defines, during the time that the actuator is accelerated and decelerated en-route to the target track, a desired acceleration/deceleration profile and desired velocity profile to achieve an efficient and predictable arrival of the head to the target track of the disk.

Disk drive makers work diligently to improve the seek profile and the seek operation. Disk drives now commonly employ velocity profile algorithms as part of their seek operation to efficiently and accurately move the head of the actuator to the target track.

One common problem associated with velocity profile seeking algorithms is the effect of back electromagnetic forces (BEMFs) associated with the coil of the actuator. Previous attempts have been made to account for BEMFs of the coil of the actuator by utilizing look-up tables to approximate how much BEMF is present for a given amount of current applied to the coil. Unfortunately, the use of a look-up table to approximate BEMFs requires a large amount of memory in the circuitry of the disk drive itself.

SUMMARY OF THE INVENTION

The present invention relates to a disk drive that implements a seek operation that utilizes a deceleration velocity profile which mathematically models back electromagnetic forces (BEMFs) associated with an actuator.

In one aspect, the invention may be regarded as a disk drive including an actuator having a coil, a head attached to the actuator, a disk including at least a first track and a second track, and a processor for controlling operations in the disk drive including a seek operation from the first track to the second track in which the head is moved between the first track and the second track by the movement of the actuator. Further, the processor under the control of a program generates a deceleration velocity profile for the seek operation. The deceleration velocity profile for the seek operation is determined based upon a deceleration velocity profile function that includes a back electromagnetic force (BEMF) model to take into account back electromagnetic forces (BEMFs) associated with the coil of the actuator such that the BEMFs are mathematically modeled. The head may then be commanded to seek to the second track utilizing the deceleration velocity profile function that includes the BEMF model.

In one embodiment, the deceleration velocity profile function that takes into account mathematically modeled BEMFs is determined utilizing an approximated acceleration solution to a second order system that includes the BEMF model. The second order system that includes the BEMF model may be described by an equation $\ddot{x}=a-rv$, wherein "x" is a position error signal, "a" corresponds to an acceleration commanded by a control effort, "r" is a BEMF coefficient, and "v" corresponds to a velocity. Particularly, a solution to this second order system that includes the BEMF model is the deceleration velocity profile function that takes into account mathematically modeled BEMFs in which the deceleration velocity profile function may be described by an equation $$v_{decel}(x) = \frac{2rx}{3} + \sqrt{\frac{4r^2x^2}{9} + 2ax}.$$

In one embodiment, the deceleration velocity profile allows the actuator to follow a low power, triangular-shaped acceleration profile.

In a further embodiment, a deceleration velocity profile settling phase may be provided, wherein during the seek operation, if the actuator does not reach a coasting velocity, the actuator is commanded to follow the deceleration velocity profile settling phase, which is based upon the deceleration velocity profile function that includes mathematically modeled BEMFs. A deceleration phase in which the actuator decelerates during the seek operation may also be provided, in which the deceleration phase utilizes the deceleration velocity profile function that includes mathematically modeled BEMFs. Further, a liner tail phase may be provided in which the head settles smoothly to the second track and the seek operation ends based upon the approximate convergence of head velocity and position error signals to approximately zero, wherein the linear tail phase utilizes the deceleration velocity profile function that includes mathematically modeled BEMFs.

In another aspect, the invention may be regarded as a method to implement a seek operation to move a head from a first track to a second track in a disk drive. The method comprises generating a deceleration velocity profile for the seek operation, in which the deceleration velocity profile for the seek operation is determined based upon a deceleration velocity profile function that includes a back electromagnetic force (BEMF) model to take into account back electromagnetic forces (BEMFs) associated with the coil of an actuator such that the BEMFs are mathematically modeled and commanding the head to seek to the second track utilizing the deceleration velocity profile function that includes the BEMF model.

The foregoing and other features of the invention are described in detail in the detailed description and are set forth in the appended claims.

DETAILED DESCRIPTION

Figure 1:
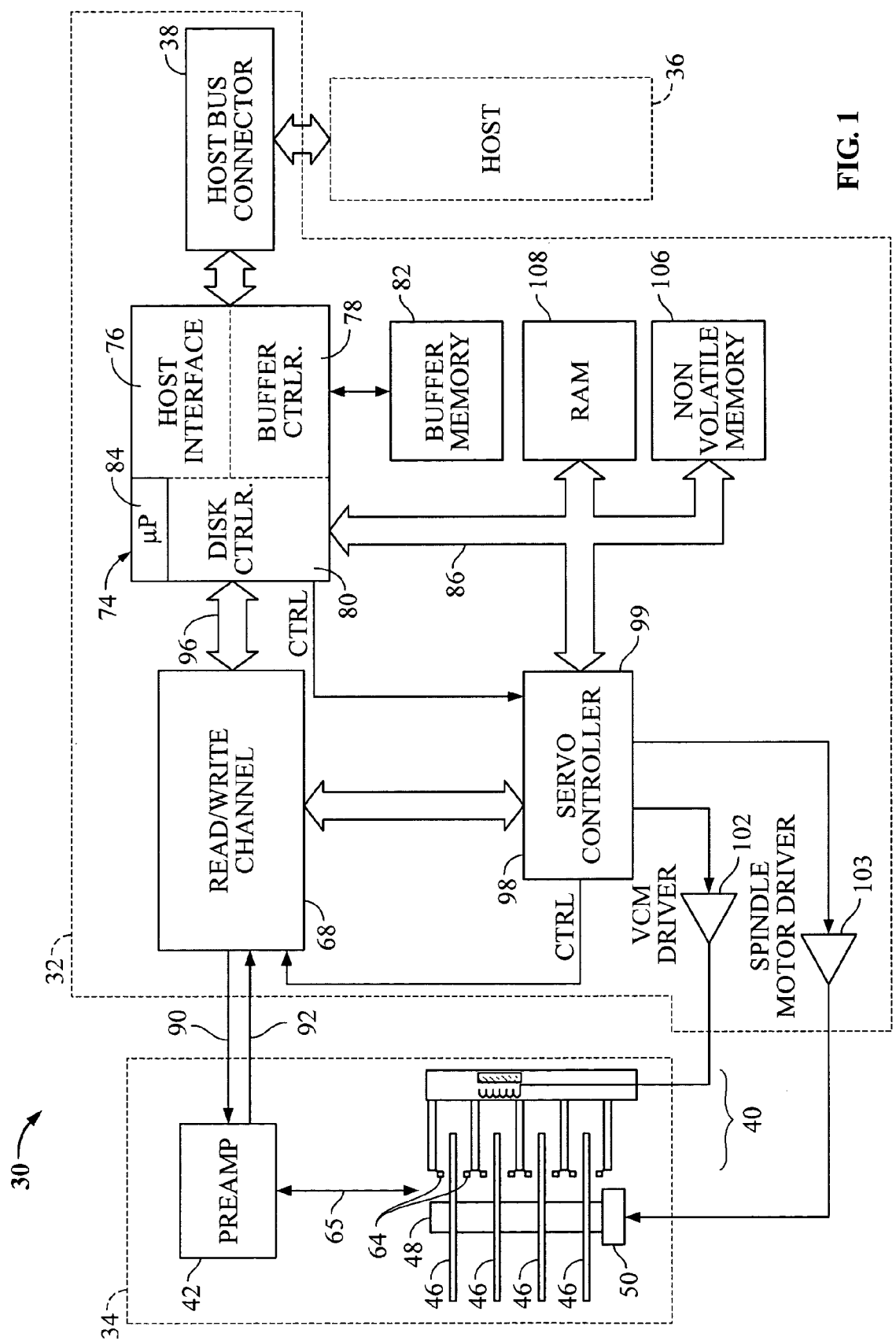
FIG. 1 shows a block diagram of a disk drive, such as a hard disk drive, in which embodiments of the invention may be practiced.

FIG. 1 shows a block diagram of a disk drive, such as a hard disk drive 30, in which embodiments of the invention may be practiced. The disk drive 30 may be connected to a host computer 36. Disk drive 30 comprises a Head/Disk Assembly (HDA) 34 and a controller printed circuit board assembly, PCBA 32.

The HDA 34 comprises: one or more disks 46 for data storage; a spindle motor 50 for rapidly spinning each disk 46 (four shown) on a spindle 48; and an actuator assembly 40 for moving a plurality of heads 64 in unison over each disk 46. The heads 64 are connected to a preamplifier 42 via a cable assembly 65 for reading and writing data on disks 46. Preamplifier 42 is connected to channel circuitry in controller PCBA 32 via read data line 92 and write data line 90.

Controller PCBA 32 comprises a read/write channel 68, servo controller 98, host interface disk controller HIDC 74, voice coil motor driver VCM 102, spindle motor driver SMD 103, microprocessor 84, and several memory arrays—buffer or cache memory 82, RAM 108, and non-volatile memory 106.

Host initiated operations for reading and writing data in disk drive 30 are executed under control of microprocessor 84 connected to controllers and memory arrays via a bus 86. Program code executed by microprocessor 84 may be stored in non-volatile memory 106 and random access memory RAM 108. Program overlay code stored on reserved tracks of disks 46 may also be loaded into RAM 108 as required for execution.

During disk read and write operations, data transferred by preamplifier 42 is encoded and decoded by read/write channel 68. During read operations, channel 68 decodes data into digital bits transferred on an NRZ bus 96 to HIDC 74. During write operations, HIDC provides digital data over the NRZ bus to channel 68 which encodes the data prior to its transmittal to preamplifier 42. Preferably, channel 68 employs PRML (partial response maximum likelihood) coding techniques.

HIDC 74 comprises a disk controller 80 for formatting and providing error detection and correction of disk data and other disk drive operations, a host interface controller 76 for responding to commands from host 36, a buffer controller 78 for storing data which is transferred between disks 46 and host 36, and microprocessor 84. Collectively the controllers in HIDC 74 provide automated functions which assist microprocessor 84 in controlling disk operations.

A servo controller 98 provides an interface between microprocessor 84 and actuator assembly 40 and spindle motor 50. Microprocessor 84 commands logic in servo controller 98 to position actuator 40 using a VCM driver 102 and to precisely control the rotation of spindle motor 50 with a spindle motor driver 103.

Disk drive 30 may employ a sampled servo system in which equally spaced servo wedge sectors (termed "servo wedges") are recorded on each track of each disk 46. Data sectors are recorded in the intervals between servo sectors on each track. Servo sectors are sampled at regular intervals to provide servo position information to microprocessor 84. Servo sectors are received by channel 68, and are processed by servo controller 98 to provide position information to microprocessor 84 via bus 86.

Particularly, the microprocessor 84 and/or servo controller 98 may operate under the control of a program or routine to execute methods or processes in accordance with embodiments of the invention related to implementing a seek operation utilizing a deceleration velocity profile that mathematically models back electromagnetic forces (BEMFs) associated with the coil of an actuator. For example, such a program may be implemented in software or firmware (e.g. stored in non-volatile memory 106 or other locations) and may be implemented by microprocessor 84 and/or servo controller 98.

More particularly, as will be discussed in more detail later, the microprocessor 84 and/or servo controller 98 under the control of a program: generates a deceleration velocity profile for a seek operation in which the deceleration velocity profile for the seek operation is determined based upon a deceleration velocity profile function that includes a back electromagnetic force (BEMF) model to take into account back electromagnetic forces (BEMFs) associated with the coil of an actuator such that BEMFs are mathematically modeled and commands a head of the actuator to seek to a second track utilizing the deceleration velocity profile function that includes the BEMF model.

Figure 2:
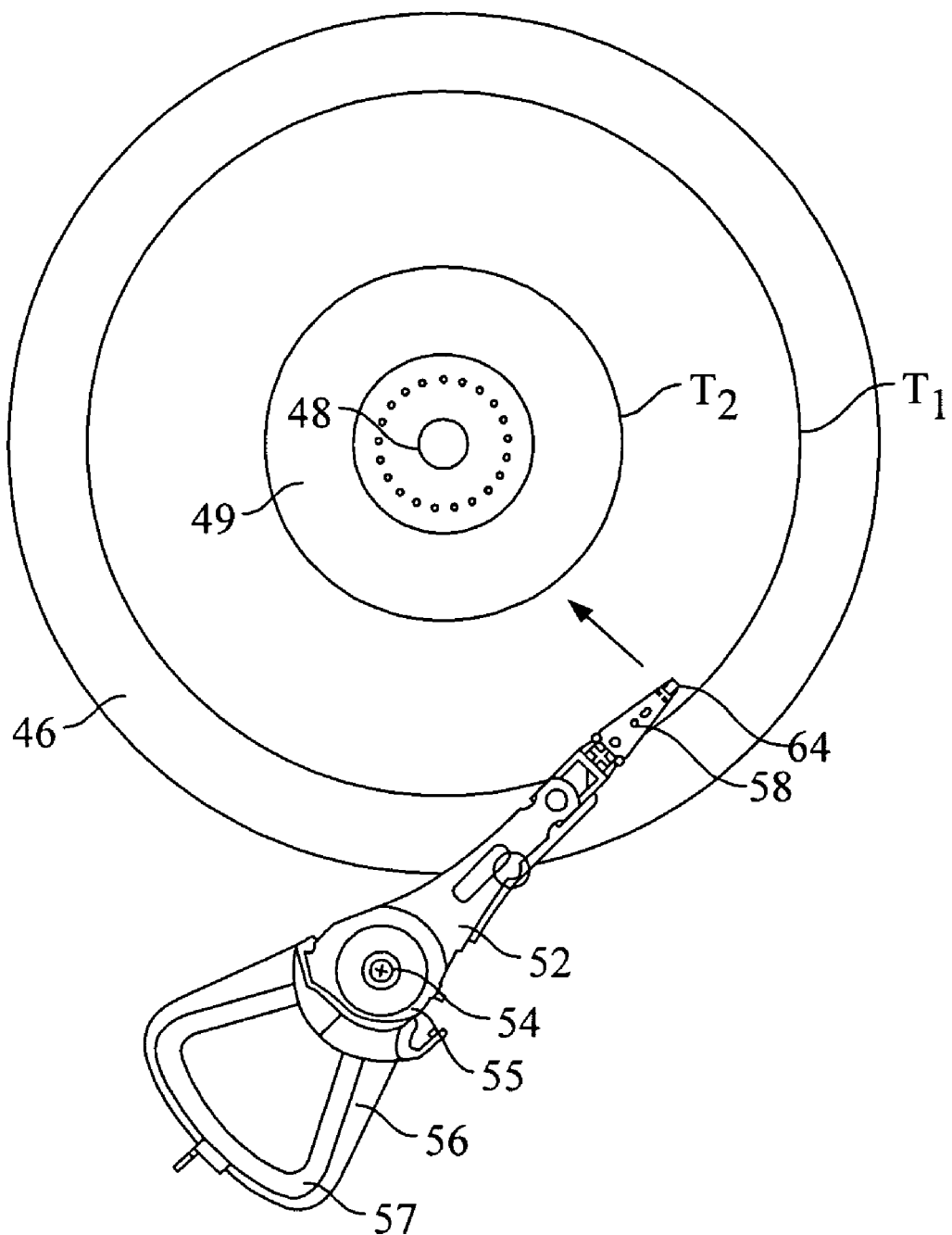
FIG. 2 is an example of an actuator and a disk.

Turning to FIG. 2, FIG. 2 is an example of an actuator and a disk. As shown in FIG. 2, a rotary actuator 51 is shown relative to a disk 46 for pivoting the head 64 of the rotary actuator 51 about the disk to perform seek operations and read/write operations, etc.

As previously discussed, disk 46 may be mounted within the disk drive on a spindle 48 utilizing a disk clamp 49 for rapid rotation within the disk drive. The rotary actuator 51 in turn moves head 64 over the disk 46.

The rotary actuator 51 may be part of a head stack assembly (HSA) of the HDA 34. It should be appreciated that HSAs and rotary actuators are well known in the art, and this is but one example.

Looking at this particular example, rotary actuator 51 may include a head gimbal assembly (HGA) 58 to which a head 64 is mounted, a body portion 55 having a pivot bore for receipt of a pivot bearing cartridge 54, at least one actuator arm 52 cantilevered from the body portion 55, and a coil assembly 53 cantilevered from the body portion 55 in an opposite direction from the actuator arm 52. The actuator arm 52 supports HGA 58 that supports head 64 for writing and reading data to and from the disk 46, respectively. For example, the head can include an inductive head that is used to both read and write data on a recording surface of the disk 46, or a magnetoresistance (MR) head, which includes a MR head element to read data and an inductive element to write data.

The coil assembly 53 includes a coil 57 and a fork 56. The fork 56 cantilevered from the body portion 55 in an opposite direction from the actuator arm 52 and mounts the coil 57. The rotary actuator 51 is pivotly secured to the base of the disk drive via the pivot bearing cartridge 54 mounted through the pivot bore of the body portion 55 of the rotary actuator arm 51. In this way, the head 64 at the distal arm of the HGA 58 may be moved over a recording surface of the disk 46. It should be appreciated that the rotary actuator 51 may include a vertical stack of HGAs supported by multiple actuator arms for use with multiple vertically stacked disks 46.

Further, as previously discussed with reference to FIG. 1, a voice coil motor 102 may be utilized with rotary actuator 51 in order to precisely position actuator 51 under the control of servo controller. In one example, the VCM may also include one or more VCM plates which each include a permanent magnet. The coil 57 of the rotary actuator 51 may be disposed between the top and bottom VCM plates in order to form a voice coil motor to cause the pivoting of the actuator 51 about the pivot axis defined by the pivot bearing cartridge 54 by inputting current into the coil 57. Thus, the voice coil motor can be used to controllably position the head 64 of the actuator 51 relative to the disk for writing and/or reading data. However, it should be appreciated that many other types of actuators and positioning means for the actuator may be utilized in accordance within embodiments of the invention, and this is just one example.

Thus, proceeding with the present example, the disk drive may include an actuator 51 having a coil 57, a head 64 attached to the actuator, and a disk including at least a first track $T_1$ and a second track $T_2$. A microprocessor may be used for controlling operations in the disk drive including a seek operation from the first track $T_1$ to the second track $T_2$ in which the head 64 is moved between the first track and the second track by the movement of the actuator 51.

More particularly, the microprocessor under the control of a program may generate a deceleration velocity profile for the seek operation. The deceleration velocity profile for the seek operation may be determined based upon a deceleration velocity profile function that includes a back electromagnetic force (BEMF) model to take into account back electromagnetic forces (BEMFs) associated with the coil 57 of the actuator 51 such that BEMFs are mathematically modeled and the processor commands the head 64 to seek to the second track $T_2$ utilizing the deceleration velocity profile function that includes the BEMF model.

The velocity profile seeking algorithm utilizing a BEMF model, as will be discussed hereinafter, achieves fast and smooth seek settle performance with low power consumption, while at the same time, because it is a mathematical model, does not require a large amount of memory to implement. As will be discussed, embodiments of the invention relate to new analytical deceleration velocity profile equations that are derived in a phase plane to approximate the closed form deceleration velocity profile solution with a BEMF model included. Phase plane transition phases based upon the velocity profile with BEMF model are also described to guarantee smooth transition from acceleration phase to deceleration phase.

As will be discussed, according to an approximate closed loop form acceleration solution for a second order system including a BEMF model, analytical deceleration velocity profile equations are derived. Further, transition control laws to connect acceleration phase control law to deceleration phase will also be discussed.

Particular attention will now be paid to the derivation of the deceleration velocity seek profile that mathematically models BEMFs. The deceleration velocity profile function that takes into account mathematically modeled BEMFs is determined utilizing an approximated acceleration solution to a second order system that includes the BEMF model. More particularly, in order to derive the proximate time optimal seek (PTOS) velocity seek profile function with the BEMF model included, a second order system with a BEMF force is utilized. Below is an example of a second order system that includes the BEMF model:

$$\ddot{x} = a - rv \qquad (1)$$

In the second order system that includes the BEMF model, "x" is a position error signal, "a" is an acceleration commanded by a control effort, "r" is a BEMF coefficient, and "v" is velocity. From equation (1), it can be determined that higher velocity will provide extra deceleration capability. Although it will hurt acceleration at the same time. However, if "a" is assumed to be constant, a bang—bang optimal control deceleration equation can be derived as follows:

$$a = \frac{v^2}{2x} - \frac{2rv}{3} \qquad (2)$$

From the above equation (2), the following deceleration profile function can be determined:

$$v_{decel}(x) = v(x) = \frac{2rx}{3} + \sqrt{\frac{4r^2x^2}{9} + 2ax} \qquad (3)$$

Thus, a solution to the second order system that includes the BEMF model is the deceleration velocity profile function (3) that takes into account mathematically modeled BEMFs.

In order to connect the deceleration velocity profile function (3) with a linear tail profile smoothly, the following deceleration and tail functions are derived according to its zero order and first order continuity at a switching point $x_{sw}$:

$$v_{decel}(x) = \begin{cases} \dfrac{\frac{4r^2 x_{sw}}{9} + a}{\sqrt{\frac{4r^2 x_{sw}^2}{9} + 2ax_{sw}}} & \text{if } |x| \leq x_{sw} \\ \dfrac{2rx}{3} + \sqrt{\dfrac{4r^2 x_{sw}^2}{9} + 2ax} - v_{offset} & \text{if } |x| > x_{sw} \end{cases} \qquad (4)$$

where $v_{offset} =$ (5)

$$\frac{2rx_{sw}}{3} + \sqrt{\frac{4r^2 x_{sw}^2}{9} + 2ax_{sw}} - \frac{\frac{4r^2 x_{sw}^2}{9} + 2ax_{sw}}{\sqrt{\frac{4r^2 x_{sw}^2}{9} + 2ax_{sw}}}$$

From the above equation (4), it can be determined that bang—bang control type deceleration functions should be used when the magnitude of the position error signal is larger than $x_{sw}$, and then should be switched to linear tail function when the position error signal is within the $x_{sw}$ range. The $v_{offset}$ is derived from equation (4) to guarantee profile continuity at switch point $x_{sw}$.

Figure 3:
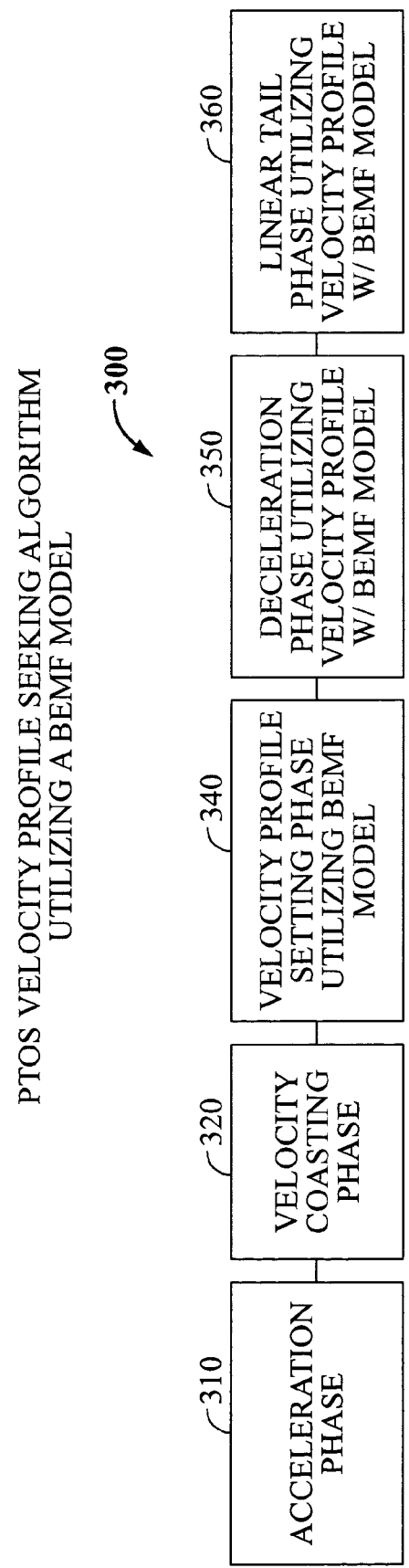
FIG. 3 is a block diagram illustrating various phases of a proximate time optimal control (PTOS) velocity profile seeking algorithm utilizing a BEMF model, according to one embodiment of the invention.

With reference to FIG. 3, FIG. 3 is a block diagram illustrating various phases of the proximate time optimal control (PTOS) velocity profile seeking algorithm utilizing a BEMF model, according to one embodiment of the invention. Particularly, FIG. 3 shows an acceleration phase 310, a velocity coasting phase 320, a velocity profile settling phase utilizing the BEMF model, a deceleration phase utilizing the velocity profile with the BEMF model 350, and a linear tail phase utilizing the velocity profile with the BEMF model 360.

As part of the PTOS velocity profile seeking algorithm utilizing a BEMF model, an acceleration phase 310 is first determined. It should be noted that any acceleration control equation can be selected as long as it accelerates the velocity from zero to a desired deceleration velocity profile when away from a desired target track. For example, a bang—bang control type open loop fixed acceleration magnitude input with slew rate limit can be used for time optimal critical disk drives. If low power consumption is desired, then a triangle-shaped acceleration seek profile may be utilized.

In one embodiment, the following equation may be utilized for the acceleration phase:

$$u = -K_v(v - v_{coast}) \qquad (6)$$

In this equation, "u" is the control input, "v" is estimated velocity, "$v_{coast}$" is desired coasting velocity and "$K_v$" is velocity loop gain for acceleration. A low power consumption seek profile (e.g. triangle shape) can be generated automatically with the above control law. Parameter $K_v$ can be tuned to meet desired maximum current limit.

Velocity coasting phase 320 can also utilize the above equation continuously upon a switch from acceleration phase to velocity coasting phase. In this instance, no extra settle algorithm is needed in switching.

However, if the seek length is not long enough to reach a coasting velocity before the velocity reaches the deceleration velocity seek profile, then the control law needs to be switched directly from the previously described acceleration equation to the following control law:

$$u = -K_v(v - v_{decel}(x)). \qquad (7)$$

In this control law, "$v_{decel}$" is the deceleration profile function utilizing the BEMF model (as was previously discussed in detail) and "x" is the position error signal. It should be noted that "$v_{coast}$" is different from the "$v_{decel}(x)$" value. A control effort discontinuity may be expected to cause a rough transition which will cause settling problems when switching from the seek algorithm to the track follow algorithm.

The following profile setting algorithm is described below to resolve this problem:

$$u = -K_v(v - v_{settle}) \qquad (8)$$

$$v_{settle} = v_{decel}(x) + (v_{coast} - v_{decel}(x)) \times f_{decrease} \qquad (9)$$

In these equations, "$v_{settle}$" is the transition settle velocity to smoothly migrate control efforts from equation (6) to equation (7), "$f_{decrease}$" can be any monotonically decreasing function. It should be noted that the profile settle phase starts when the estimated velocity is less than the $v_{predecel}(x)$ which is a pre-determined ratio constant times $v_{decel}(x)$ deceleration profile value to ensure smooth transition.

Utilizing the previously determined deceleration velocity profile function (i.e. $v_{decel}(x)$) this function may be utilized in the velocity profile settling phase utilizing the BEMF model 340, the deceleration phase utilizing the velocity profile with the BEMF model 350, and the linear tail phase utilizing the velocity profile with BEMF model 360.

Particularly, as to the deceleration velocity profile settling phase 340, as will be discussed, during the seek operation, if the actuator does not reach a coasting velocity, the actuator may be commanded to follow the deceleration velocity profile settling phase, which is based upon the deceleration velocity profile function ($v_{decel}(x)$) that includes mathematically modeled BEMFs.

As to the deceleration phase 350, during the deceleration phase, the actuator decelerates during the seek operation and, as will be described, the deceleration phase utilizes the deceleration velocity profile function that includes mathematically modeled BEMFs. Particularly, in deriving the deceleration phase, since a closely followed velocity deceleration seek profile is desired, higher velocity loop gain is needed and may be different from initial loop gain $K_v$. Thus, a new deceleration control law is derived as follows:

$$u = -K_{v\_decel}(v - v_{decel}(x)) \qquad (10)$$

$$K_{v\_decel} = \max(K_v \times f_{increase}, K_{v\_decel\_max}) \qquad (11)$$

In the above equations, $K_{v\_decal\_max}$ is the maximum deceleration loop gain, $K_{v\_decal}$ is transition loop gain and $F_{increase}$ can be any monotonically increasing function.

As to the linear tail phase utilizing the velocity profile with the BEMF model 360, in the linear tail phase, the head should settle smoothly to the second track and the seek operation should end based upon approximate convergence of head velocity and position error signals to approximately zero, and the linear tail phase utilizes the deceleration velocity profile function that includes mathematically modeled BEMFs. More particularly, to achieve a better settling in the end of the profile following seek, the linear tail portion is needed to ensure the convergence of velocity and position error signals to zero. A linear tail control law is described below:

$$u = -Kv\_decel\_max*(v-tail\_slope*pes) \quad (12)$$

In the above equation tail_slope is the desired linear tail slope in the velocity and position error signal phase plane. The control law is switched from deceleration phase to linear tail phase when the PES is less than a specified switched value.

Figure 4:
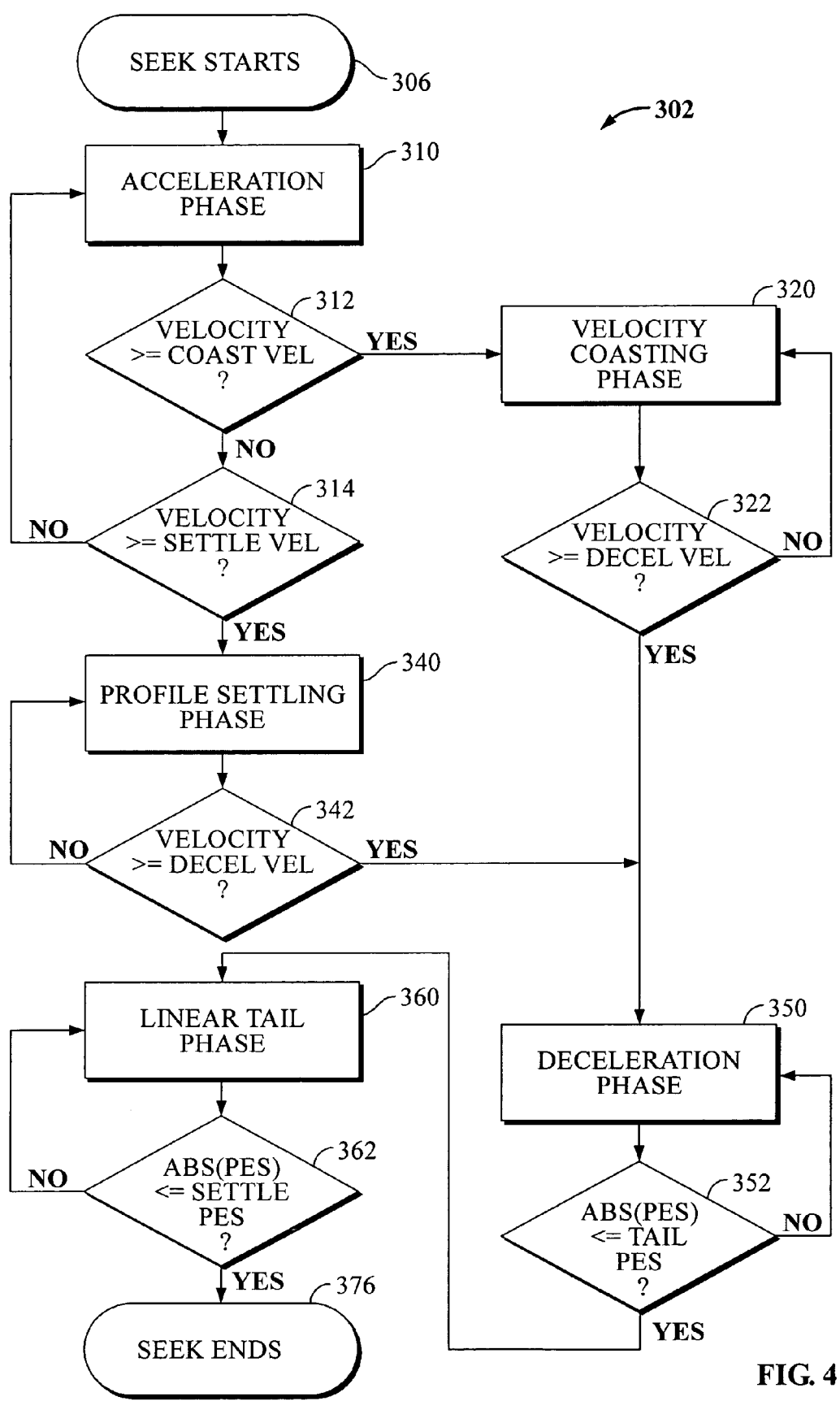
FIG. 4 is a flow diagram illustrating a seek operation utilizing the deceleration velocity profile function that includes the BEMF model to take into account BEMFs associated with a coil of the actuator, according to one embodiment of the invention.

Turning now to FIG. 4, FIG. 4 is a flow diagram 302 illustrating a seek operation utilizing the deceleration velocity profile function that includes the BEMF model to take into account BEMFs associated with a coil of the actuator such that BEMFs are mathematically modeled and taken into account during the seek operation.

Figure 5:
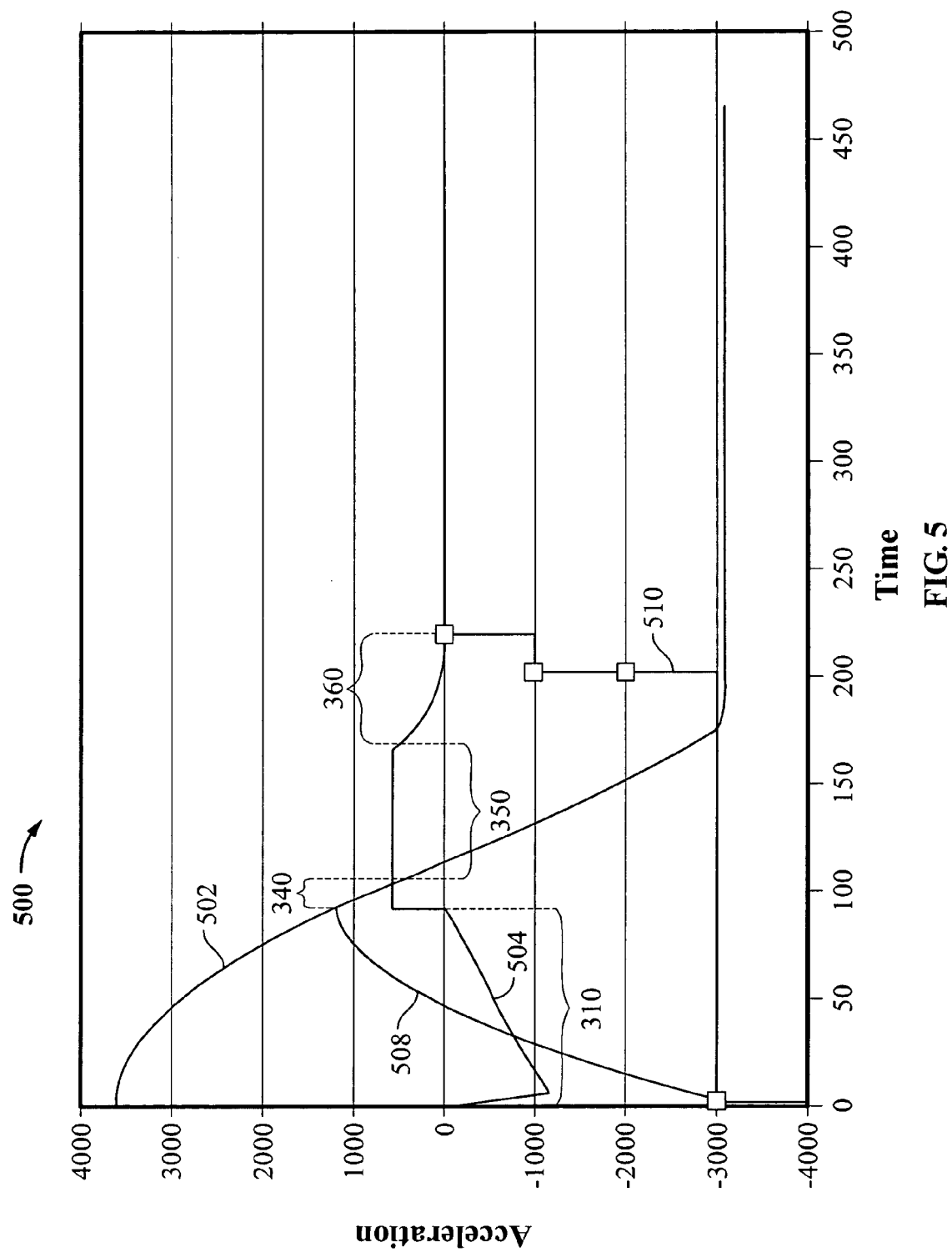
FIG. 5 is a graph illustrating a seek profile for a head of an actuator that is controlled utilizing the PTOS velocity profile seeking algorithm utilizing a BEMF model.

FIG. 4 illustrating the seek operation can also be viewed in conjunction with FIG. 5 which is a graph illustrating a seek profile for a head of an actuator that is controlled utilizing the PTOS velocity profile seeking algorithm utilizing a BEMF model.

More particularly, the graph of FIG. 5 illustrates acceleration versus time. Line 504 represents the acceleration profile of the head of the actuator versus the target track. Line 502 represents the deceleration velocity profile function that takes into account mathematically modeled BEMFs ($v_{decel}(x)$), previously discussed in detail. Line 503 represents the previously discussed $v_{predecel}(x)$. Line 508 represents the actual velocity of the head. Further, as will be discussed, FIG. 5 is for the case in which during the seek operation, the head of the actuator does not reach a coasting velocity.

With reference to FIG. 4, at block 306 the seek starts. Next, at block 310 the acceleration phase is entered in which the head of the actuator is accelerated towards the target track. This is also shown in FIG. 5 by bracket 310. As can be seen the acceleration phase 310 allows the actuator to follow a low power triangular-shaped acceleration profile.

At block 312 it is determined whether the actual velocity 508 is greater than a coast velocity. If so, a velocity coasting phase 320 is entered, which will be discussed with reference to FIG. 6.

If the actual velocity 508 does not reach a coast velocity, then at block 314, it is determined whether the actual velocity 508 has reached a settle velocity (i.e. is greater than or equal to the settle velocity). If not, the actuator continues to be accelerated as shown by line 504. However, when the actuator does reach the settle velocity (i.e. is greater than or equal to the settle velocity) as seen by the intersection of the actual velocity 508 and the pre-deceleration velocity profile 503, then the velocity profile settling phase 340 utilizing the BEMF model, as previously discussed, is entered.

The actual velocity of the actuator continues to increase until it reaches the end of the velocity profile settling phase 340 shown in FIG. 5, at which point, it intersects with the deceleration profile function utilizing the BEMF model (i.e. $v_{decel}(x)$) at line 502. The actual velocity 508 then tracks the velocity deceleration profile function 502.

At block 342 the actual velocity is tested to determine if the actual velocity has become equal to or greater than the deceleration velocity profile. If not, the profile settling phase 340 is continued. However, once the actual velocity becomes greater than or equal to the deceleration velocity profile function then the deceleration phase 350 is entered. As can be seen in FIG. 5 the actuator is slowly decelerated.

At block 352, the absolute position error signal (PES) of the head versus the target track is measured to determine whether it is less than or equal to the tail phase PES value at block 352. If not, the deceleration phase 350 continues. However, when the absolute PES value becomes less than or equal to the tail PES value, then the linear tail phase 360 is entered.

In the linear tail phase 360, the head eventually settles smoothly to the target track and the seek operation ends based upon approximate convergence of head velocity and position error signals (PESs) to approximately zero. Then in block 362, the absolute position error signal is continuously tested to determine if it is less than or equal to a settle PES. If not, the linear tail phase 360 continues. However, once the absolute PES value is less than or equal to the settle PES value then the head has settled smoothly to the target track and the seek operation ends at block 376.

It should be appreciated that the velocity profile settling phase 340, the deceleration phase 350, and the linear tail phase 360 are all dependent upon the deceleration velocity profile function 502 utilizing the BEMF model ($v_{decel}(x)$), the derivation of which, has been previously discussed in detail.

The previously discussed steps of FIG. 4 that have been illustrated with FIG. 5 were done for the case in which the actuator does not reach a velocity coasting phase. For example, in some instances, when the actuator is commanded to move only a certain small relative distance (e.g. less than ⅓ of the disk) then a velocity coasting phase may not be reached. However, when the actuator is commanded to move a relatively larger distance (e.g. more than ⅓ of the disk) then the actuator may reach a velocity coasting phase.

Figure 6:
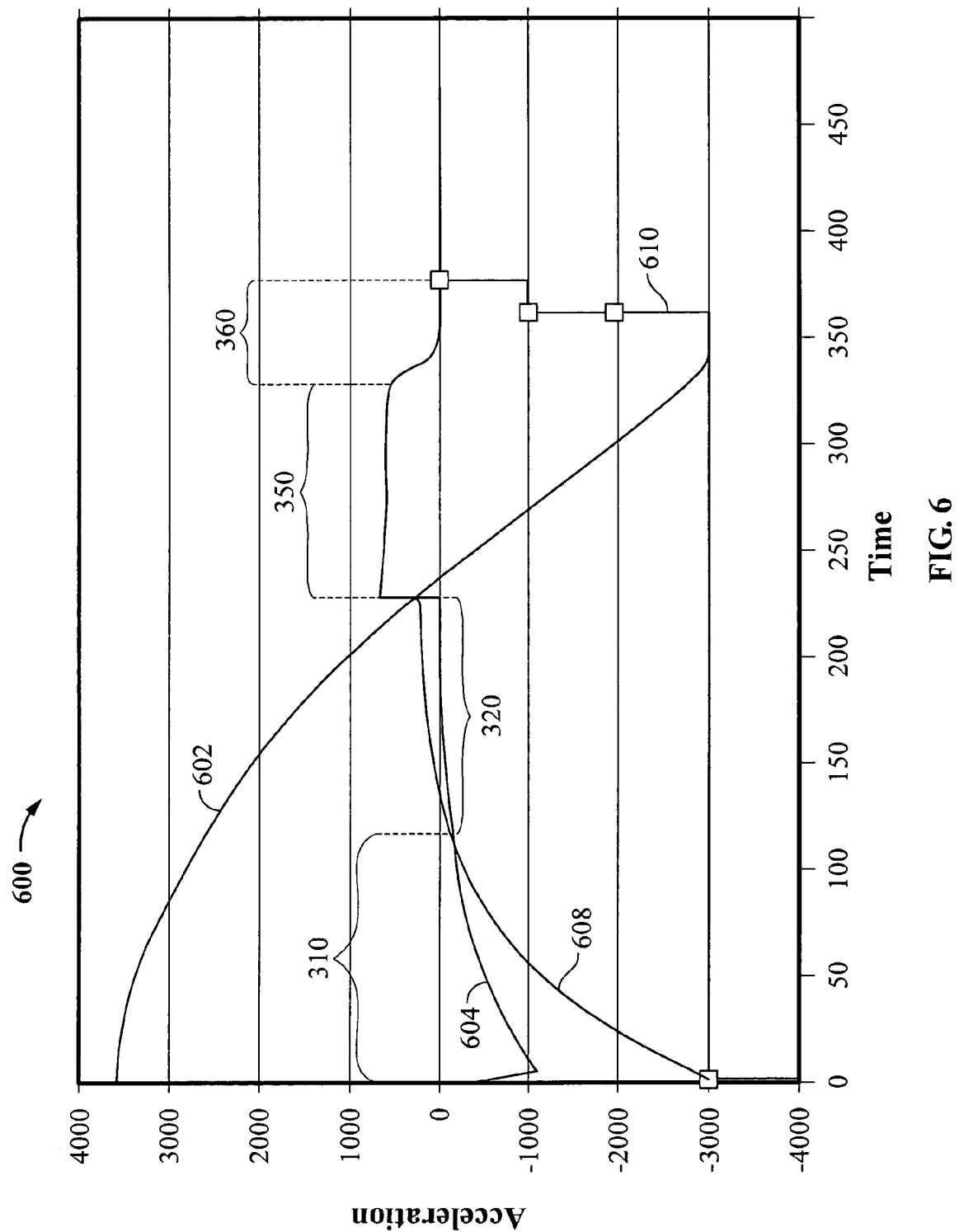
FIG. 6 is another graph illustrating a seek profile for a head of an actuator that is controlled utilizing the PTOS velocity profile seeking algorithm utilizing a BEMF model.

This example will be discussed with reference to FIG. 4 and FIG. 6. In FIG. 6, the graph illustrates acceleration versus time. Line 604 represents the acceleration profile of the head of the actuator versus the target track. Line 602 represents the deceleration velocity profile function that takes into account mathematically modeled BEMFs ($v_{decel}(x)$), previously discussed in detail. Line 608 represents the actual velocity of the head.

With reference to FIG. 4, at block 306 the seek starts. Next, at block 310 the acceleration phase is entered in which the head of the actuator is accelerated towards the target track. This is also shown in FIG. 6 by bracket 310. As can be seen the acceleration phase 310 allows the actuator to follow a low power triangular-shaped acceleration profile.

At block 312 it is determined whether the actual velocity 608 is greater than a coast velocity. If so, a velocity coasting phase 320 is entered. The velocity coasting phase is typically entered when the actuator is commanded to move a relatively large distance (e.g. more than ⅓ of the disk). At block 322, it is determined if the actual velocity 608 is greater than or equal to the deceleration velocity profile function 602. If not, the velocity coasting phase 320 continues. However, if the actual velocity 608 is greater than or equal to the deceleration velocity profile function 602 than the deceleration phase 350 is entered.

At block 352, the absolute position error signal (PES) of the head versus the target track is continuously measured to determine whether it is less than or equal to the tail phase PES value at block 352. If not, the deceleration phase 350 continues. However, when the absolute PES value becomes less than or equal to the tail PES value, then the linear tail phase 360 is entered.

In the linear tail phase 360, the head eventually settles smoothly to the target track and the seek operation ends based upon approximate convergence of head velocity and position error signals (PESs) to approximately zero. As seen in block 362, the absolute position error signal is continuously tested to determine if it is less than or equal to a settle PES. If not, the linear tail phase 360 continues. However, once the absolute PES value is less than or equal to the settle PES value then the head has settled smoothly to the target track and the seek operation ends at block 376.

While embodiments of the present invention and its various functional components have been described in particular embodiments, it should be appreciated that the embodiments can be implemented in hardware, software, firmware, middleware, or a combination thereof and utilized in systems, sub-systems, components, or sub-components thereof. When implemented in software, or firmware, the elements of the embodiments of the invention are the instruction/code segments to perform the necessary tasks.

We claim:

1. A disk drive comprising:
    an actuator having a coil;
    a head attached to the actuator;
    a disk including at least a first track and a second track; and
    a processor for controlling operations in the disk drive including a seek operation from the first track to the second track in which the head is moved between the first track and the second track by movement of the actuator, the processor under the control of a program to:
        generate a deceleration velocity profile for the seek operation, the deceleration velocity profile for the seek operation being determined based upon a deceleration velocity profile function that includes a back electromagnetic force (BEMF) model to take into account back electromagnetic forces (BEMFs) associated with the coil of the actuator such that BEMFs are mathematically modeled; and
    command the head to seek to the second track utilizing the deceleration velocity profile function that includes the BEMF model, wherein the deceleration velocity profile function that takes into account mathematically modeled BEMFs is determined utilizing an approximated acceleration solution to a second order system that includes the BEMF model and the second order system that includes the BEMF model is described by an equation ẍ=a−rv, wherein "x" is a position error signal, "a" corresponds to an acceleration commanded by a control effort, "r" is a BEMF coefficient, and "v" corresponds to a velocity.

2. The disk drive of claim 1, wherein a solution to the second order system that includes the BEMF model is the deceleration velocity profile function that takes into account mathematically modeled BEMFs, the deceleration velocity profile function being described by an equation $$v_{decel} = \frac{2rx}{3} + \sqrt{\frac{4r^2 x_{sw}^2}{9} + 2ax}.$$

3. The disk drive of claim 1, wherein the deceleration velocity profile allows the actuator to follow a low power triangular-shaped acceleration profile.

4. The disk drive of claim 1, further comprising a deceleration velocity profile settling phase, wherein during the seek operation, if the actuator does not reach a coasting velocity, the actuator is commanded to follow the deceleration velocity profile settling phase, which is based upon the deceleration velocity profile function that includes mathematically modeled BEMFs.

5. The disk drive of claim 1, further comprising a deceleration phase in which the actuator decelerates during the seek operation, the deceleration phase utilizing the deceleration velocity profile function that includes mathematically modeled BEMFs.

6. The disk drive of claim 1, further comprising a linear tail phase in which the head settles smoothly to the second track and the seek operation ends based upon approximate convergence of head velocity and position error signals to approximately zero, wherein the linear tail phase utilizes the deceleration velocity profile function that includes mathematically modeled BEMFs.

7. In a disk drive including a disk having a first track and a second track and a head attached to an actuator having a coil, a method to implement a seek operation to move the head from the first track to the second track comprising:
    generating a deceleration velocity profile for the seek operation, the deceleration velocity profile for the seek operation being determined based upon a deceleration velocity profile function that includes a back electromagnetic force (BEMF) model to take into account back electromagnetic forces (BEMFs) associated with the coil of the actuator such that BEMFs are mathematically modeled; and
    commanding the head to seek to the second track utilizing the deceleration velocity profile function that includes the BEMF model, wherein the deceleration velocity profile function that takes into account mathematically modeled BEMFs is determined utilizing an approximated acceleration solution to a second order system that includes the BEMF model and the second order system that includes the BEMF model is described by an equation ẍ=a−rv, wherein "x" is a position error signal, "a" corresponds to an acceleration commanded by a control effort, "r" is a BEMF coefficient, and "v" corresponds to a velocity.

8. The method of claim 7, wherein a solution to the second order system that includes the BEMF model is the deceleration velocity profile function that takes into account mathematically modeled BEMFs, the deceleration velocity profile function being described by an equation $$v_{decel} = \frac{2rx}{3} + \sqrt{\frac{4r^2 x_{sw}^2}{9} + 2ax}.$$

9. The method of claim 7, wherein the deceleration velocity profile allows the actuator to follow a low power triangular-shaped acceleration profile.

10. The method of claim 7, further comprising a deceleration velocity profile settling phase, wherein during the seek operation, if the actuator does not reach a coasting velocity, the actuator is commanded to follow the deceleration velocity profile settling phase, which is based upon the deceleration velocity profile function that includes mathematically modeled BEMFs.

11. The method of claim 7, further comprising a deceleration phase in which the actuator decelerates during the seek operation, the deceleration phase utilizing the deceleration velocity profile function that includes mathematically modeled BEMFs.

12. The method of claim 7, further comprising a linear tail phase in which the head settles smoothly to the second track and the seek operation ends based upon approximate convergence of head velocity and position error signals to approximately zero, wherein the linear tail phase utilizes the deceleration velocity profile function that includes mathematically modeled BEMFs.

* * * * *